United States Patent Office 3,092,515
Patented June 4, 1963

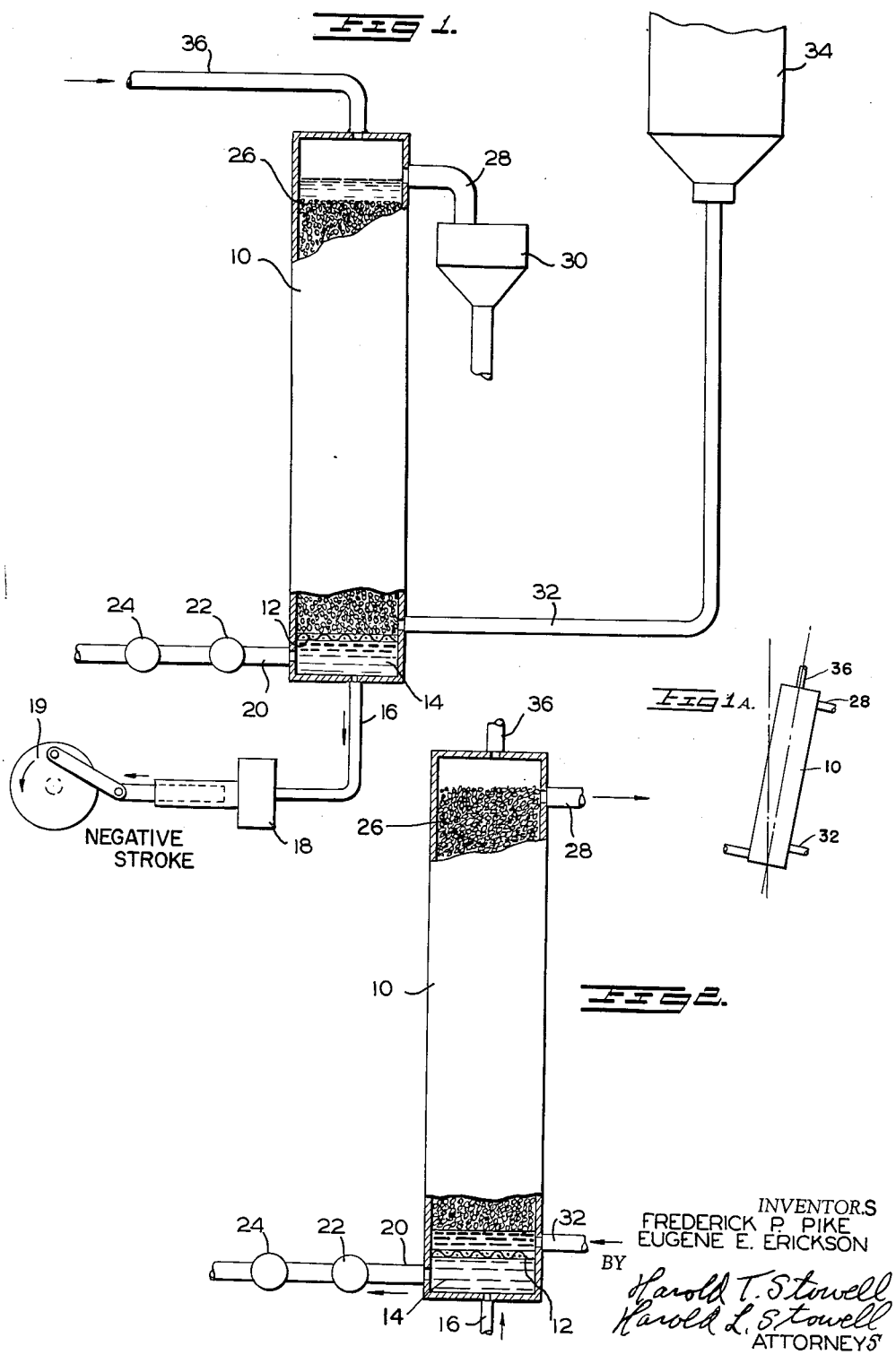

3,092,515
MOVING-BED LIQUID-SOLID CONTACTOR
AND OPERATION THEREOF
Frederick P. Pike, Raleigh, N.C., and Eugene E. Erickson, Idaho Falls, Idaho, assignors to Research Corporation, New York, N.Y., a corporation of New York
Filed Sept. 14, 1959, Ser. No. 839,910
6 Claims. (Cl. 134—25)

The present invention relates to a method and apparatus for accomplishing mass-transfer operations between liquid and solid phases, as for example, leaching, adsorption, desorption, ion exchange and the like, including cases where mass-transfer is accompanied by chemical reactions, and, more particularly, relates to a moving-bed liquid-solid contactor wherein the liquid and solid phases are moved essentially continuously and countercurrently through a contacting zone to effect the desired mass transfer.

The term solid phase, or solids phase, is considered to refer to any practical state of subdivision of a particular solid, as for instance a slurry of solid particles or fibers. However, the solid phase is sometimes meant to include any liquid or gaseous phase that permeates a phase ordinarily considered to be solid, such as by virtue of its porous or gel nature.

The apparatus and method of the invention may be employed, for example, in effecting ion exchange between beads of treating resins and a liquid phase being processed. The conventional means of ion exchange processed involves the use of fixed beds of treating resins through which the liquid to be processed is passed until such time as the exchange capacity of the resin bed becomes exhausted. The flow is then terminated and the resin is washed and regenerated, after which the bed is again put into operation. Generally, three separate beds are used for each liquid stream, to make semi-continuous operation possible by permitting one bed to be regenerated while another is in use, and the third is involved in switching from one operation to the other and in necessary maintenance. This technique, which is known commonly as the fixed bed or batch method, is not continuous and requires a large physical plant if high output is required. Furthermore, because each bed operates under non-steady-state conditions, the outlet stream varies with time in its composition and requires close attention to achieve uniform control of product purity and properties. In addition, it is not possible to employ the concept of reflux action without the use of large batteries of fixed beds operating under complicated, multitudinous and interrelated flow patterns.

In order to overcome some of the disadvantages of fixed-bed operation, improved apparatus and methods were developed wherein the liquid phase and the solid (resin) phase are caused to move essentially continuously and countercurrently. In a typical example of this particular type of apparatus, employing a resin heavier than the liquid, pulses are utilized to move the solids phase upwardly and the liquid phase downwardly through the contacting zone. The pulsing action is caused by suitable arrangement to motivate other necessary actions, such as the inflow of the solids phase and the outflow of the liquid phase, without the need of more than one moving mechanism, a simple check valve. The net and automatic consequence of the pulsing action is a desirable type of countercurrent flow and contact between the liquid and solid phases.

Continuous, countercurrent liquid-solid contacting equipment falls into two general classes, distinguished by the mechanical features thereof. The first class includes contactors which depend primarily upon mechanical devices within the contactor to move the solids phase through and countercurrent to the liquid phase; the second class includes contactors which depend primarily upon density differences between the phases, and/or applied pressure-differentials, or the physical continuity of the solid phase to cause the countercurrent movement.

The first general class includes screw conveyors operating in troughs, bucket lifts, bag lifts, travelling screens, moving belts and many others. This class of apparatus has been used principally for extraction or leaching operations as, for example, the removal of vegetable oils from a natural source. These operations are types of liquid-solid contact, and from a theoretical standpoint are in the same class as ion exchange and/or adsorption. However, commercial development through the years has led to mechanically-complex equipment designed specifically to handle particular combinations of physical properties of naturally-occurring substances.

Contactors of the second general class which do not require internal mechanisms are not necessarily completely devoid of any internal mechanism, but if such is present, its purpose is auxiliary (as a solids or liquid phase distributor) and does not in itself drive or carry the solids phase. This class of apparatus, with which the present invention is concerned, has been considered to be of more interest in commercial applications by virtue of its internal simplicity; generally greater surface area available for mass transfer, per unit volume of apparatus; higher throughput capacity for either phase; and ability to operate with flow patterns, such as refluxing operation, identical in principle to those of continuous countercurrent contactors for liquid-liquid and gas-liquid systems.

Both the liquid- and solids-phase throughput capacities of countercurrent contactors which depend upon density differences for the flow of the solids-phase through the counter-moving liquid-phase, are severely limited by the physical properties of the phases, and by the drag of the flow of the other phase. Contactors emphasizing this motivation are often called falling-bed contactors. Typically, with a solid heavier than the liquid, the solids phase falls downward against the rising flow of the liquid. The solids throughput is restricted directly by the density difference between the two phases, the liquid viscosity, the distribution of sizes and shapes of the solids particles, and the velocity of the liquid flow. These natural forces set a maximum limit on the rate of fall of the solids phase through the liquid phase. The liquid flow rate on the other hand must be kept below that point at which the solids bed will expand, fluidize, and fail to move in the required direction against the liquid flow. These two limitations, unfortunately, tend to restrict the ranges of countercurrent throughput to considerably less than is generally desired.

To overcome the inherent limitations of falling-bed contactors, equipment and procedures have been developed either to alternate the flow actions or to push the solids phase by hydraulic gradients. But limitations on the maximum flow rates, although raised above that of falling beds, still exist, and it is found that a complicated valving system with complicated controls is required. These valves and controls are a particular handicap where radioactive materials are to be handled, for they represent additional opportunities for leakage and additional complications for cases of either remote or direct maintenance.

Much of the current commercial interest appears to be concentrated in moving bed contactors of the above types, or in a unit in which the solids phase moves as a semi-fluidized, or expanded bed, across perforated trays, passing downwardly from tray to tray through downcomers (as in a perforated gas-liquid or liquid-liquid column). Here again, serious limitations exist on the maximum flow rates of each of the two phases, and on the particle sizes and densities that can be reasonably employed.

The contactor apparatus of the present invention overcomes the fluidization limitation on flow rates by moving the solids phase generally in the direction opposite to the tendency of the particles to fall by virtue of the density difference. By this manner, the force of gravity tends to hold the bed together, contrary to the case of a falling-bed contactor. For solids heavier than the liquid, the solids bed is moved essentially upwardly while the liquid phase is moved essentially downwardly, countercurrent to the liquid phase. Also it is mechanically very simple, not requiring externally controlled valves and timing devices or any synchronization in the timing of the operation of mechanical features. All moving parts and devices and other potential sources of leaks can be segregated into one area, which is an advantage for the processing of highly radioactive materials. An additional advantage over other countercurrent moving-bed apparatus accrues from the use of a feed system not completely subservient to column operating conditions, but rather controlled in part by variations in feed line design, resin properties, liquid level in the feed tank, pressure above the feed slurry, and other factors.

The present invention has for one of its primary objects the production of a greatly simplified apparatus which nevertheless is capable of achieving greater throughput capacity and, accordingly, a higher processing rate than is customary for liquid-solid contactors.

Another object of the invention is to produce an essentially-continuous countercurrent liquid-solid contacting device wherein the net flow of the solids phase is in the direction against the normal tendency to fall and the net flow of the liquid through the contacting zone is in the opposite direction. For a solid heavier than the liquid, the net direction of flow of the solids phase is upward. For a solid lighter than the liquid, the net direction of flow of the solids phase is downward.

Another object of the invention is to produce an essentially-continuous countercurrent liquid-solid contacting device which is adapted to permit complex flow patterns of the liquid and solids phases, such as multiple feeds, multiple withdrawals of either phase, and the return of phases to the contacting zone to provide for refluxing action as in distillation columns.

A further object of the invention is to produce a method and apparatus of the continuous countercurrent liquid-solid contacting type wherein the liquid and the solids are moved essentially countercurrently through the contacting zone by the action of pulses applied to one end of that zone. When the solid phase is heavier than the liquid, the pulses are applied to the lower end; when the solid phase is lighter than the liquid phase, the pulses are applied to the upper end of the contacting zone.

Still another object of the invention is to produce an apparatus for effecting mass transfer between liquid and solid phases, such as for the purpose of the selective separation of components from either phase, which is characterized by relatively inexpensive components, only one actuating part being necessary to effectively achieve the objectives of the invention. Further, there is no need of moving parts, or valves, in the flow path of the solids phase, thus minimizing attrition of the solids.

These and other objects of the invention may be carried out by apparatus for the continuous countercurrent contact of a liquid with a subdivided solid which comprises an apparatus hereinafter described for the case of a solid heavier than the liquid. For solids lighter than the liquid, the flow directions of the two phases are the reverse of those described. For the case specified, the apparatus comprises a vertically extending contacting chamber, a liquid-permeable septum extending across the chamber adjacent to and spaced from the bottom thereof, conduit means for supplying liquid to the upper portion of the chamber, conduit means extending from the lower portion of the chamber below the septum including valve means permitting flow in this conduit out of the chamber only, conduit means for supplying the subdivided solid to the lower portion of the chamber above the septum, conduit means for conducting a suspension of solids in the liquid from the upper portion of the chamber, and means for applying pulses to the liquid in said chamber below the septum, whereby on the positive or power stroke of each pulse a portion of the solids suspended in the liquid is forced out of the upper portion of the chamber, and during a portion of this positive stroke a suspension or slurry of solids flows into the chamber above the septum, and on the negative stroke of each pulse a portion of liquid is drawn into the upper portion of the solids bed.

Other objects and advantages of the invention will be apparent from the following detailed description with reference to the accompanying drawings, in which:

FIGURE 1 is a diagrammatic view partly in section illustrating the method and apparatus of the present invention, and conditions during a negative stroke of the piston, FIG. 1A is a diagrammatic view of a contact chamber similar to that illustrated in FIG. 1 showing the chamber or column inclined from the vertical, and FIGURE 2 is a diagrammatic view partly in section of the contact chamber of the apparatus of FIGURE 1 specifically showing the flow of the constituents during a different portion of the cycle from that shown in FIGURE 1, namely during a positive or power stroke of the piston.

Referring to FIGURE 1, there is an elongate, vertically-extending contact chamber 10 having a liquid permeable screen or septum 12 extending across the chamber 10 adjacent to and spaced from the bottom thereof. The screen or septum 12 has smaller apertures therein than the solid particles to be contacted so that none of the solid particles which are disposed upon the screen 12 will be able to flow into the compartment 14 formed between the bottom wall of the chamber 10 and the screen 12.

The compartment 14 communicates through a conduit 16 with a conventional diaphragm type pump 18 which is actuated by a suitable motor-drive 19. The compartment 14 is also provided with an outlet conduit 20 which is provided with a check valve 22 and a control valve 24. This control valve is intended to be set once for the particular set of flow conditions desired and not changed after that unless the column operation changes. The check valve 22 allows passage of clear liquid out of the compartment only and valve 24 sets the average rate of flow of fluid through the conduit 20.

Above the screen or septum 12, there is provided within the chamber 10, a bed of particulate solid material 26 which is supported upon the screen 12. The chamber 10 is further provided with an outlet conduit 28 for discharging spent solid-particles or granules of bed 26 to a separator 30.

The bottom of the chamber 10 is provided with a solids inlet conduit 32 which leads from a solids feed reservoir 34 to the chamber 10 at a point immediately above the screen 12. It will be appreciated that the disposition of the solids feed reservoir 34 must be high enough with respect to the liquid level in the top of the column so that the solids and some liquid may feed downwardly from the reservoir as a slurry through the conduit 32 and into the chamber 10, during that part of the stroke cycle illustrated by FIGURE 2.

The upper portion of the contact chamber 10 is provided with a conduit 36 through which the liquid to be treated is introduced into the chamber 10. Some of this liquid is employed to wash out the outgoing solids into separator 30, from which the wash liquid may be recycled to conduit 36.

FIGURE 2 particularly shows the disposition of the constituents within the contact chamber 10 during the positive or power stroke of the pump 18, as will be described in greater detail hereinafter in connection with a description of the operation of the apparatus.

In operation, first consider the consequences of a negative stroke of pump 18, diagrammatically illustrated in FIGURE 1. As the piston actuator of the diaphragm pulsing pump 18 is moved in the direction of the arrow shown in FIGURE 1, the bed of solids 26 is caused to be retained in a packed condition against and supported by the liquid permeable screen or septum 12. Simultaneously with such conditioning of the bed 26, the suction developed by the negative stroke closes check valve 22 and, therefore, prevents the inward flow of fluid through the conduit 20. It will be appreciated that the packing effect of the solid bed 26 in the lower portion of the contact chamber 10 where the solids from the solids reservoir 34 are introduced thereinto through the conduit 32, acts to militate against any further flow of the solids into the chamber 10. A continuing downward pulse functions to draw liquid which has been introduced into the top of the chamber 10 through the conduit 36, downwardly through the bed 26, through the permeable screen or septum 12 and finally into the chamber or compartment 14.

Now consider the consequences of a positive or power stroke of the pulsing pump 18, as illustrated in FIGURE 2. Initially the resistance of the liquid outlet line or conduit 20 is adjusted by setting the control valve 24 so that during a positive stroke of the pulsing pump 18, part of the liquid within the compartment 14 passes outward from the system through the outlet conduit 20 and part of the liquid is caused to flow upwardly through the liquid permeable screen or septum 12. The portion of the pulse energy which acts on the bed of solids 26 functions in the manner of a piston and physically moves the solids bed upwardly. Manifestly, some of the liquid does tend to flow upwardly through the bed and thereby subtracts from the piston action, but the applied pulse is of such short duration that the resultant action is mostly as a fluid piston.

As the bed of solids 26 moves upwardly under the action of the applied pulse, the zone immediately above the screen or septum 12 in effect is transformed into a fluid zone. This comes about because the bottom layers of the solids bed lose their structure, expand, and disintegrate in the turbulence of the rising liquid. A small fluidized region of slurry forms and grows as the pulse stroke continues. Although the fluidized region contains a high volume percentage of solids, the particles ceased to press upon each other and the properties of a fluid prevail. This fluidization of the bottom of the solids bed acts like the opening of a valve on the solids feed line 32 and a solids slurry starts flowing inwardly into the base of the chamber 10 through the solids feed line 32, impelled by the hydrostatic and solids pressure resulting either from the elevation of the feed reservoir 34 or pressures imposed in it. In the same pulse cycle, as will be noted from an examination of FIGURE 2, a portion of the solids bed 26 in the upper region of chamber 10 that has been moved upwardly is caused to overflow through the outlet conduit 28 into the separator 30.

Then the cycle is repeated by the pulsing pump 18 acting again to produce a downward pulse as diagrammatically illustrated in FIGURE 1. As a consequence of the apparatus of the invention, it will be appreciated that in spite of the back and forth action of the pulse stroke each phase, liquid as well as solids, advances more in the direction intended in one part of the pulse cycle than it recedes in the next part of that cycle. The net effect for each phase is essentially a steady progression through the contacting zone, with a longer and often more effective time of contact than would be the case without the back and forth motion. Considering the action as a whole, the net effect is essentially a continuous, steady-state, countercurrent contact between the phases.

It will be appreciated from the above description that the principles and advantages of continuous, steady-state, countercurrent mass-transfer contact between a liquid and a solid phase have been attained by the apparatus and operation of this invention. This type of contact generally provides many advantages over batch or semi-continuous operation, and also over parallel flow systems. A continuous operation, as opposed to batch or semi-continuous operation, leads to much greater processing capacity for a given size of equipment which translate into less equipment and lower capital costs. Also of great importance, the essentially steady-state nature of the flows implied by continuous operation permits the production of product streams whose compositions do not change with time. In this case, the compositions and their associated flows can carefully and methodically be adjusted to the optimum conditions of temperature, time-of-contact, contacting ratio, and other such factors, for the purposes of the management of the operations.

The countercurrent feature generally makes the most effective use of the diffusional driving forces which cause the mass transfer to take place. Finally, and of great importance, the combination of continuous, steady-state, and countercurrent features permits a great flexibility in the flow patterns within the system. It greatly facilitates provision in the liquid-solid case for the refluxing action which, as is well illustrated in many vapor-liquid contacts, so greatly increases the degree of separation or purification obtained. Further, it facilitates provision for multiple feed streams, or multiple withdrawals to produce multiple products from one processing system.

A typical example of an apparatus employing the principles of the present invention utilized 20–50 mesh Dowex 50–8X ion exchange resin in a one and one-half inch inside diameter contact chamber, ten and one-half inches long. This provided a length to diameter ($L/D$) ratio of 7.0. Liquid rates as high as 200 gallons/(ft.)$^2$ (hr.) were employed, with higher rates possible if the flow resistance of the particular fluid discharge line were reduced. Solids rates of about 0.29 ft./minute, or 130 gallons of solids bed per ft.$^2$ per hour were reached. Resin throughput capacity was found to be responsive to operating and contact chamber variables. Of the operating variables, a pulse-amplitude range from 0.24 to 1.08 inches in the chamber, per stroke, and frequencies from about 1 to 110 cycles per minute were utilized. The liquid flow rate, which is an operating variable, ranged from about 0 to 200 gallons/(ft.)$^2$ (hr.), and was found, for the given feed tank and line conditions, to be limited by either the pulse rate (since the pump discharges the liquid phase on the up-pulse), or the resistance of the exit liquid line. In practice, as the exit liquid flow rate increases, absorbing more and more of the pulse, the solids flow rate decreases, until, as the liquid rate approaches the frequency-amplitude product, the solids rate becomes zero. The solids flow rate and the liquid flow rate are, then, inter-related.

The optimum pulse frequency for the solids flow rate was found to range from about 5 to 15 cycles per minute. The optimum pulse amplitude for the solids flow rate was about 0.5 inch for liquid rates up to about 50 gallons per (ft.)$^2$ (hr.); at 100 gallons per (ft.)$^2$ (hr.), it was about 1 inch. The solids flow rate is related in a complicated way to the pulse amplitude and pulse frequency. However, at amplitudes above about 0.5 inch, the solids flow rate is approximately a function only of what might be called the effective pulse, the product of the frequency and that portion of the total pulse volume, expressed as an amplitude in the chamber, that passes the septum 12 during a pulse stroke.

Of the contact chamber variables (those pertaining to the equipment geometry), chamber length is of greatest effect. Quite probably the effect of column length enters through the ratio of bed length to bed diameter. Solids rates decrease markedly as the length increases, other conditions being constant. For example, for a column diameter of 1.5 inches, at 0.46 inch amplitude, with an optimum frequency around 8.6 cycles per minute, and zero net liquid flow, an increase of chamber length from 10.5 to 28.5 inches (length to diameter ratio 7.0 to 19.0) decreases the solids flow rate from 0.29 to 0.044 foot per minute. This effect appears to be mainly the result of wall friction between the solids and the chamber wall.

For variations in the solids feed reservoir conditions, other factors constant, the liquid pressure driving force per unit of feed tube length appears to be the controlling feature for solids flow rate. Increasing the liquid levels in the tank, which increases the pressure available per unit length of solids-feed tube, is effective in increasing the solids flow rate. For example, at a frequency of 5.1 cycles per minute with the base of the feed tank at 43 inches above the point of entry of the feed conduit into the contact chamber, and a liquid flow rate between about 5 to 10 gallons per ft.$^2$ per hour, increasing the liquid level in the tank 34 from 9 to 23 inches above its base, increased the solids flow rate from 0.10 to 0.22 foot per minute in a column 16.5 inches long. It appears that some control of the solids flow rate can be obtained by manipulation of the liquid pressure in the feed reservoir.

The measured relationship between the pressure drop across the moving bed, during the pulse cycle, indicated a direct proportionality with the liquid flow rate, and thereby that the flow pattern through the void spaces of the bed was laminar, or streamline, rather than turbulent. This meant that in spite of the back and forth motion, the liquid tended to flow through the contact chamber without back-flow due to turbulence. This action is desired in countercurrent contactors in order to maintain and preserve the maximum values of the diffusional concentration gradients between the phases in contact. Similarly, studies made with layers of colored solids within the solids bed indicated that the solids bed also moved through the contacting zone practically entirely as a plug, without longitudinal mixing.

The solids feed entering through conduit 32 does so as a kind of a slurry. The solids portion is accompanied by liquid that can be considered as normal hold-up filling the void spaces, plus some liquid that percolates through the line bed due to hydrostatic pressure. The total volume of the liquid from the solids feed line tank that enters the chamber 10 through the solids feed conduit, at a liquid flow rate through the column of about 100 gallons per (ft.)$^2$ (hr.), represents less than 20 percent of the liquid discharge; this fraction becomes progressively smaller as the liquid throughput is increased. This auxiliary liquid stream can be composed of liquid recycled from the exit liquid, if dilution is a problem.

For maximum solids flow rate, an optimum ratio exists between the size of the feed line 32 and the chamber 10. Some test data indicates that the feed line area should be 8 to 10 percent of the column cross-sectional area. It was found by experiment that the solids throughput rate could be increasd by inclining the column from the vertical. This is illustrated by comparative experiments, using the same resin particles, the same 1.5 inch inside diameter column 22.5 inches long, and operating at pulse frequencies adjusted to the optimum for each angle of inclination. Under these conditions, the pulse amplitude was set to deliver about the same liquid flow rate, 0.15 to 0.20 foot per minute. When the column was vertical, the solids flow rate was 0.0025 foot per minute, equivalent to 1.12 gallons per hour per square foot of column cross section. However, when the column was inclined until it was 30 degrees away from the horizontal, the solids flow rate rose about 30 times to 0.075 foot per minute, 33.7 gallons per hour per square foot.

The arrangement of the inclined column is illustrated in FIG. 1A.

In summary, the following are typical advantages of equipment incorporating the principles of the invention.

(1) A solid and a liquid phase can be contacted in a countercurrent fashion, in essentially a continuous and steady-state manner from the point of view of mass transfer.

(2) The two countercurrent flow rates can be controlled independently to obtain various contacting ratios. Further, each rate may be raised to highly desirable levels, thereby conferring high processing capacity to the contacting equipment.

(3) Needing only one motivating mechanism, one check valve, and one contacting chamber, the basic unit is relatively cheap, easy and rapid to build, easy to operate, simple to understand and control.

(4) Since the pulse producing means and the few valves involved may be disposed and operated remotely from the contact chamber, the resultant simplicity of the unit minimizes maintenance and control, and minimizes the consequences of leakages at moving parts, thereby favoring its use in the processing of radioactive materials.

It will be readily apparent to those skilled in the art that in certain applications of the invention advantageous results could be obtained by disposing the contact chamber so that it is inclined from the vertical.

According to the provisions of the patent statutes, we have explained the principles and mode of operation of our invention, and as illustrated and described what we now consider to represent its best embodiment. However, we desire to have it understood that, within the scope of the appended claims, the invention may be practiced otherwise than as specifically illustrated and described.

We claim:

1. Apparatus for essentially continuous, countercurrent contact of a liquid with a subdivided and free-flowing solid dense enough to settle downward through the liquid, comprising a vertically extending columnar contact chamber, a liquid permeable septum extending across said chamber adjacent to and spaced from the bottom thereof, conduit means for supplying liquid to the upper portion of the chamber, conduit means extending from the lower portion of the chamber below said septum including valve means permitting flow of liquid out of said chamber only, conduit means for supplying the subdivided solids to the lower portion of said chamber above said septum, conduit means for conducting a suspension of the solids from the upper portion of the chamber, said contact chamber having a substantially unrestricted interior portion extending from said conduit means for supplying the subdivided solids to said conduit means for conducting a suspension of the solids, and means for applying pulses to the liquid in said chamber below said septum whereby on the positive stroke of each pulse a portion of solids suspended in the liquid is caused to flow out of the upper portion of the chamber, a portion of solids is caused to flow into the chamber above said septum, and a portion of the liquid is caused to flow out of the lower portion of the chamber below said septum, and on the negative stroke of each pulse a portion of liquid is drawn into the upper portion of the chamber, a portion of the liquid is drawn down through the chamber and a portion is drawn through the septum into the lower portion of said chamber.

2. The invention according to claim 1 whereby the columnar contacting chamber is inclined from the vertical.

3. The invention according to claim 1 wherein said means for applying pulses comprises a diaphragm pump.

4. The invention according to claim 1 whereby said conduit means extending from the lower portion of the chamber below said septum includes a control mechanism effectively controlling the portion of the pulse volume allowed to pass therethrough, and thereby also the portion of the pulse stroke allowed to pass through said septum.

5. The invention according to claim 1 wherein said conduit means for supplying the subdivided solids to the lower portion of said chamber includes a subdivided solids receptacle containing a supply of the subdivided solids material.

6. A method for essentially continuous countercurrent contact of a liquid with a subdivided and free-flowing solid dense enough to settle downward through the liquid which comprises supporting a column of the solids on a liquid permeable septum, supplying the liquid to the upper portion of the column, supplying solids to the lower portion of the column, and applying pulses to the liquid in said column from below said septum whereby on the positive stroke of each pulse a portion of solids suspended in the liquid is forced out of the upper portion of the chamber, a portion of the liquid is forced out of the lower portion of the chamber and a portion of the solids feed is caused to enter the chamber and on the negative stroke of each pulse a portion of the lquid is drawn into the upper portion of the solids bed, a portion is drawn down through the bed, and a portion is drawn through the septum into the lower part of the chamber below the septum.

References Cited in the file of this patent

UNITED STATES PATENTS

| | | |
|---|---|---|
| 2,381,965 | Berry | Aug. 14, 1945 |
| 2,730,239 | Peery | Jan. 10, 1956 |
| 2,742,381 | Weiss | Apr. 17, 1956 |
| 2,744,066 | Spiess | May 1, 1956 |

FOREIGN PATENTS

| | | |
|---|---|---|
| 780,406 | Great Britain | July 31, 1957 |